(12) United States Patent
Miyajima et al.

(10) Patent No.: US 7,778,238 B2
(45) Date of Patent: *Aug. 17, 2010

(54) IP TELEPHONE APPARATUS

(75) Inventors: Akira Miyajima, Yokohama (JP); Kazuto Kobayashi, Kawasaki (JP)

(73) Assignee: Panasonic Corporation, Osaka (JP)

( * ) Notice: Subject to any disclaimer, the term of this patent is extended or adjusted under 35 U.S.C. 154(b) by 1359 days.

This patent is subject to a terminal disclaimer.

(21) Appl. No.: 11/235,156

(22) Filed: Sep. 27, 2005

(65) Prior Publication Data

US 2006/0072553 A1    Apr. 6, 2006

(30) Foreign Application Priority Data

Oct. 5, 2004    (JP) .............................. 2004-292866

(51) Int. Cl.
*H04L 12/56* (2006.01)
(52) U.S. Cl. ................. 370/352; 370/260; 370/356; 370/395.5; 370/431; 707/999.003; 709/203; 709/219
(58) Field of Classification Search ......... 370/352–356, 370/260, 395.52, 431; 379/199–200, 211.01–214.01, 379/355.01; 709/245, 203, 219; 707/999.03
See application file for complete search history.

(56) References Cited

U.S. PATENT DOCUMENTS

| 6,498,797 | B1 |  | 12/2002 | Anerousis et al. |  |
|---|---|---|---|---|---|
| 7,269,162 | B1 | * | 9/2007 | Turner | ........................ 370/352 |
| 7,286,553 | B2 |  | 10/2007 | Tanimoto |  |
| 7,320,026 | B2 | * | 1/2008 | Adamczyk | ................... 709/219 |
| 7,453,827 | B2 | * | 11/2008 | Toyoda | ........................ 370/260 |
| 7,508,819 | B2 | * | 3/2009 | Kobayashi et al. | .......... 370/352 |
| 7,602,767 | B2 | * | 10/2009 | Miyajima et al. | ........... 370/352 |
| 7,620,036 | B2 | * | 11/2009 | Kobayashi et al. | .......... 370/352 |
| 7,653,049 | B2 | * | 1/2010 | Kobayashi et al. | .......... 370/352 |
| 2002/0099830 | A1 |  | 7/2002 | Viechter |  |
| 2003/0103492 | A1 |  | 6/2003 | Tanimoto |  |
| 2003/0214940 | A1 |  | 11/2003 | Takken |  |
| 2004/0003114 | A1 | * | 1/2004 | Adamczyk | ................... 709/245 |
| 2005/0182781 | A1 | * | 8/2005 | Bouvet | ........................ 707/102 |
| 2005/0207402 | A1 | * | 9/2005 | Kobayashi et al. | .......... 370/352 |

(Continued)

FOREIGN PATENT DOCUMENTS

EP    1061728    12/2000

(Continued)

OTHER PUBLICATIONS

English Language Abstract of JP 2004 248086.*

(Continued)

*Primary Examiner*—Gerald Gauthier
(74) *Attorney, Agent, or Firm*—Greenblum & Bernstein, P.L.C.

(57) ABSTRACT

A source IP telephone apparatus obtains, from an ENUM server, NAPTR records of a call destination based on a telephone number of the call destination, the telephone number being input by dialing. The source IP telephone apparatus then selects, from the obtained NAPTR records, a NAPTR record to be used for transmitting a call, based on a priority order, and transmits a call to the call destination based on an access method and a destination number included in the selected NAPTR record. When a destination IP telephone apparatus is busy, the second priority NAPTR record is selected and another call is made by automatically switching the access method.

6 Claims, 7 Drawing Sheets

U.S. PATENT DOCUMENTS

| | | | |
|---|---|---|---|
| 2005/0226264 A1* | 10/2005 | Toyoda | 370/431 |
| 2005/0286499 A1* | 12/2005 | Kobayashi et al. | 370/352 |
| 2006/0029045 A1* | 2/2006 | Kobayashi et al. | 370/352 |
| 2006/0029049 A1* | 2/2006 | Kobayashi et al. | 370/356 |
| 2006/0067305 A1* | 3/2006 | Kobayashi et al. | 370/352 |
| 2006/0092922 A1* | 5/2006 | Kobayashi et al. | 370/352 |
| 2007/0189500 A1* | 8/2007 | Stanford | 379/355.01 |
| 2010/0014512 A1* | 1/2010 | Kobayashi et al. | 370/352 |

FOREIGN PATENT DOCUMENTS

| | | |
|---|---|---|
| JP | 1-189262 | 7/1989 |
| JP | 8-130594 | 5/1996 |
| JP | 2002-518953 | 6/2002 |
| JP | 2003-169103 | 6/2003 |
| JP | 2004-153317 | 5/2004 |
| JP | 2004-207892 | 7/2004 |
| JP | 2004-248086 | 9/2004 |

OTHER PUBLICATIONS

English Language Abstract of JP 8-130594.*
Sinnreich et al. "Mastering TCP/IP SIP, Chapter 14 (DVS and ENUM)" together with an English language translation of the same.*
Falstrom et al., "The E.164 to Uniform Resource Identifier (URI) Dynamic Delegation Discovery System (DDDS) Application (ENUM)," IETF Standard, Internet Engineering Task Force, IETF, CH, (Apr. 2004), XP015009541.
Falstrom, "E. 164 number and DNS," IETF Standard, Internet Engineering Task Force, IETF, CH, (Sep. 2000), XP015008699.
Conroy et al. JPRSL, "ENUM Implementation Issues and Experiences," IETF Standard-Working-Draft, Internet Engineering Task Force, IETF, CH, Vol. enum, (Jul. 2004), XP015018179.
Stastny, "Scenarios for ENUM and ENUM-like Systems <draft-stantny-enum-scenarios-00.txt>," IETF Standard-working-draft, Internet Engineering Task Force, IETF, CH, pp. 1-18, (Jun. 2002), XP015005364.
"Report of the Department of State ITAC-T Advisory Committee Study Group A Ad Hoc on ENUM," chaired by G. Richenaker, ENUM, pp. 1-39, (Jun. 6, 2001), XP002238095.
Kaspch Carriercom AG: "ENUM Trial," online (Dec. 28, 2003), XP002363054, Retrieved from the Internet <URL:http://web.archive.org/web/20031228201931/http://www.kapsch.net/CarrierCom/de/4627_DEU_HT MLExtranetCD.html > on Jan. 10, 2005, in English and German.
ENUM Trial Japan, "ENUM Trial Japan First Report," May 2004, together with an English language translation of the same.
U.S. Appl. No. 11/150,119 to Kobayashi et al., filed Jun. 13, 2005.
U.S. Appl. No. 11/235,275 to Miyajima, filed Sep. 27, 2005.
U.S. Appl. No. 11/235,217 to Miyajima et al., filed Sep. 27, 2005.
U.S. Appl. No. 11/235,273 to Miyajima et al., filed Sep. 27, 2005.
U.S. Appl. No. 11/235,154 to Miyajima, filed Sep. 27, 2005.
U.S. Appl. No. 11/249,715 to Kobayashi et al., filed Oct. 14, 2005.

* cited by examiner

Fig.5

| Enum domain name | | Order | Preference | Flags | Service | | URI scheme | |
|---|---|---|---|---|---|---|---|---|
| | | | | | | | | URI |
| 0.0.0.0.0.0.0.1.3.1.8.e164.arpa | IN NAPTR | 100 | 10 | "u" | "E2U+sip" | "!^.*$!sip :" | 81310000000@tokyo.sip.jp" |
| | IN NAPTR | 100 | 10 | "u" | "E2U+http" | "!^.*$!http :" | //www.tokyo.sip.com/user81310000000.html" |
| 1.0.0.0.0.0.0.1.3.1.8.e164.arpa | IN NAPTR | 100 | 10 | "u" | "E2U+sip" | "!^.*$!sip :" | 81310000001@tokyo.mail.com" |
| | IN NAPTR | 100 | 10 | "u" | "E2U+http" | "!^.*$!http :" | //www.tokyo.sip.com/user81310000001.html" |

NAPTR resource record

Fig.7

```
$ORIGIN x.x.x.5.4.5.5.4.1.8.e164.arpa
IN NAPTR 100 10 "u" "E2U+sip"        "!^.*$!sip:info@sip.aaaa.com!"
IN NAPTR 104 10 "u" "E2U+talk:tel"    "!^.*$!tel:+81455445xxx!"
IN NAPTR 102 10 "u" "E2U+message:mailto" "!^.*$!mailto:miyajima.bbbb@jp.aaaa.com!"
IN NAPTR 106 10 "u" "E2U+ifax"       "!^.*$!mailto:ifax@jp.aaaa.com!"
```

IP TELEPHONE APPARATUS

BACKGROUND OF THE INVENTION

1. Field of the Invention

The present invention relates to an IP telephone apparatus that can be applied to an IP telephone system utilizing ENUM (tElephone NUmber Mapping) technology.

2. Description of Related Art

Today, it is becoming possible to utilize a plurality of communication methods in order to contact a call destination via a communication network. For example, it is possible to communicate with a call destination by one of such access methods as ordinary telephones, IP telephones, facsimiles, e-mails and cellular phones. It means that one user has a plurality of call destination's numbers such as regular telephone numbers (including fax telephone numbers), IP telephone numbers, e-mail addresses and cellular phone numbers. There is also a case where one user has a plurality of telephone numbers and e-mail addresses. Therefore, a calling user establishes a connection with a communication apparatus of a call destination by inputting, to the calling user's communication apparatus, one of the call destination's telephone numbers in accordance with the selected access method.

As described above, when one user has a plurality of call destination's numbers, even when a call is placed to an IP telephone number of the call destination and the line is busy, it is possible to call back a different number of the call destination (e.g., regular telephone number).

Moreover, some IP telephone apparatuses have not only IP telephone functions that enable voice communication via an IP network but also have telephone functions that enable voice communication via PSTN (Public Switched Telephone Network) (See Related Art 1, for example). One communication apparatus has a plurality of access methods to select from (IP and ordinary telephones).

[Related Art 1] Japanese Patent Laid-Open Publication 2004-248086

However, conventional IP telephone apparatuses require users to check a regular telephone number of the call destination and call back that telephone number when an IP telephone number of the call destination is called and the line is busy. In other words, although it is possible to use a plurality of access methods, when the line is busy, users need to input, to a communication apparatus, a different number of the call destination in order to re-access by switching to a different access method.

SUMMARY OF THE INVENTION

The present invention is provided to address the above-described problems. The purpose of the present invention is to provide an IP telephone apparatus that is capable of switching to a different access method in an order that a call destination wishes without requiring a calling user to input a different number of the call destination in order to re-access by switching to a different access method, when the line is busy.

In the present invention, NAPTR records of the call destination are obtained from an ENUM server, based on an input telephone number of the call destination. Of the obtained NAPTR records, a NAPTR record to be used for transmitting a call is selected based on a priority order, and a call is placed to the call destination based on the access method and the call destination's number included in the selected NAPTR record. When the call destination is on the phone, the second priority NAPTR record is selected, and another call is placed by automatically switching to a different access method.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 illustrates an example of a set of NAPTR records that are stored in a DB of the ENUM server according to the embodiment;

FIG. 7 illustrates an example of a set of NAPTR records for the destination IP telephone apparatus according to the embodiment.

DETAILED DESCRIPTION OF PREFERRED EMBODIMENTS

The embodiments of the present invention are explained in the following, in reference to the above-described drawings.

Figure 1:
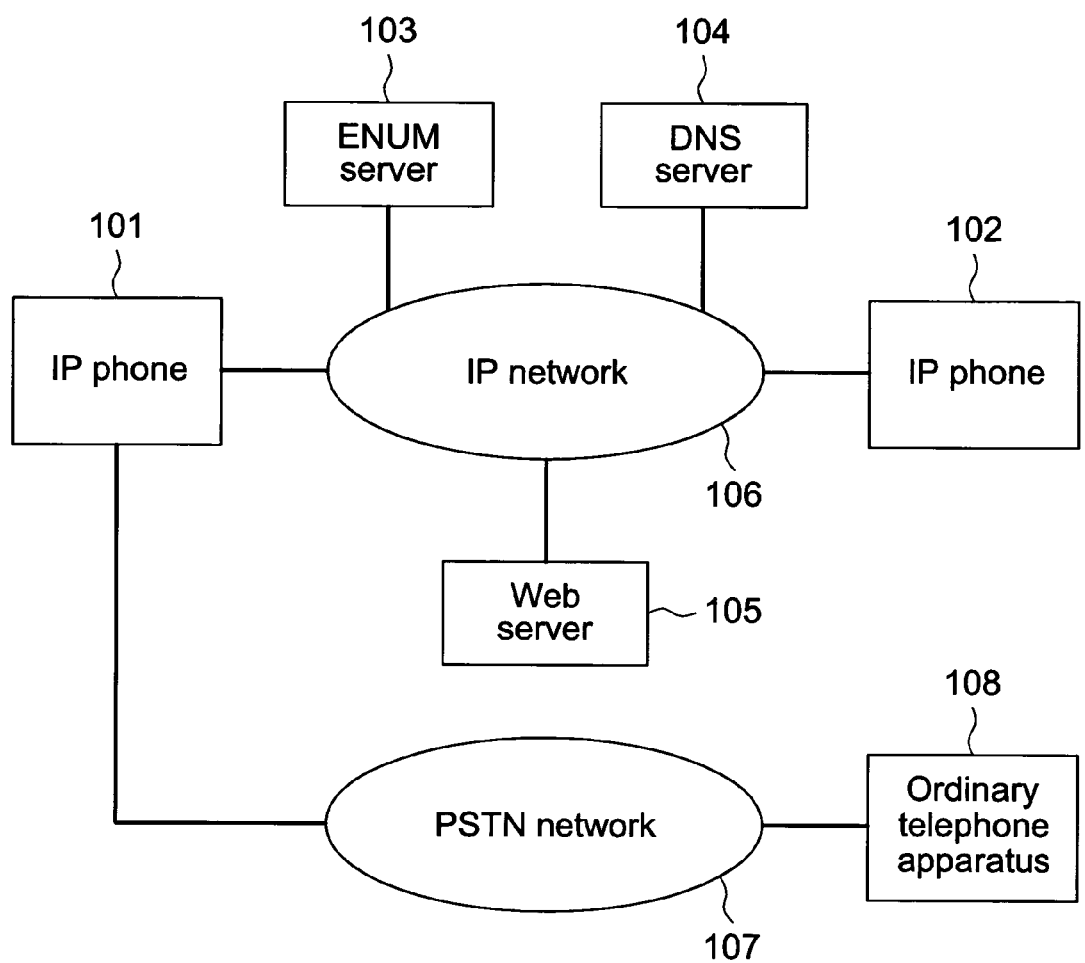
FIG. 1 illustrates a network configuration to which an IP telephone system according to an embodiment of the present invention is applied.

FIG. 1 illustrates a network configuration to which an IP telephone system according to an embodiment of the present invention is applied.

As shown in FIG. 1, a plurality of IP telephone apparatuses (hereafter referred to as "IP phone") 101, 102, ENUM server 103, DNS server 104 and Web server 105 as a database server are connected via IP network 106. IP phones 101 and 102 are examples of IP terminals that enable voice communication via IP network 106. IP phone 101 is configured to enable voice communication with ordinary telephone apparatus 108 via PSTN network 107.

IP phone 101 (102) has a function that enables voice communication via IP network 106 after establishing a session with another IP telephone apparatus based on a call control protocol such as H.323, H.248 and SIP (Session Initiation Protocol). IP phone 101 (102) also has a browsing function that allows users to access Web server 105 according to an http protocol and to read HTML texts provided by Web server 105.

ENUM server 103 is equipped with a database (DB) that stores a NAPTR resource record (hereafter referred to as "NAPTR record"), which is described later. The DB of ENUM server 103 stores one URI or a plurality of URIs in the form of a NAPTR record. These URIs are used to specify a corresponding IP terminal, on IP network 106, based on a domain name related to each IP terminal. ENUM server 103 transmits, to IP phone 101 (102), a NAPTR record stored in the DB in response to a query (hereafter referred to as "ENUM query") from IP phone 101 (102).

DNS server 104 is equipped with a DB that stores URIs specified in NAPTR records and IP addresses corresponding to the URIs. DNS server 104 retrieves, from the DB, an IP address corresponding to a URI, and transmits, to IP phone 101 (102), the IP address in response to a query from IP phone 101 (102).

Web server 105 is equipped with a DB that stores information (hereafter referred to as "caller information") to identify a caller of IP phone 101 (102) that is connected to IP network 106. Caller information includes the caller's telephone number (hereafter referred to as "caller number"), name, address, e-mail address and image data such as a photo of the caller's face. Caller information is not limited to individual information and may include a company's name, telephone number, address, e-mail address and advertisement. Web server 105 transmits, to IP phone 101 (102), caller information stored in the DB in response to a request from IP phone 101 (102) that has received a call.

Figure 2:
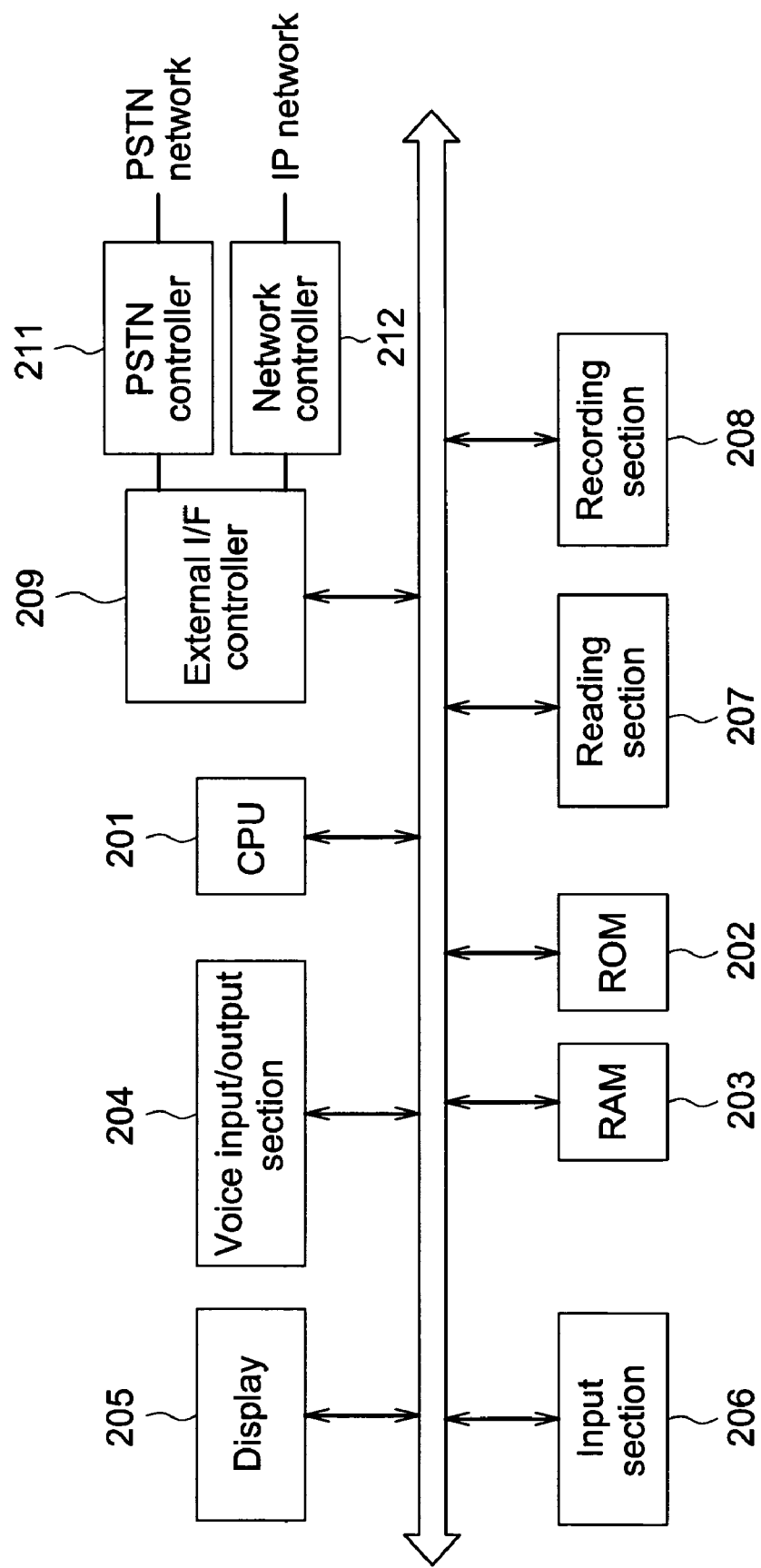
FIG. 2 is a block diagram illustrating a configuration of an IP telephone apparatus that constitutes the IP telephone system according to the embodiment.

FIG. 2 is a block diagram illustrating a configuration of IP phone 101 according to the present embodiment. IP phone 102 has the same configuration as IP phone 101.

IP phone 101 may perform various installed functions such as IP telephone, facsimile and e-mail functions when CPU 201 reads in and executes a program stored in ROM 202. ROM 202 stores an application program that provides functions such as IP telephone, facsimile and e-mail functions. RAM 203 serves as a work area for CPU 201.

IP phone 101 includes voice input/output section 204, display 205 and input section 206. Voice input/output section 204 is equipped with a microphone and a speaker for voice communication. Display 205 displays various information including caller and call destination's numbers. Input section 206 includes numeric keypad, button, softswitch and the like. IP phone 101 further includes reading section 207 and recording section 208. Reading section 207 is used to scan documents to be faxed. Recording section 208 is used to print received data.

IP phone 101 is configured to be able to connect to PSTN 107 and IP network 106 via external I/F controller 209. External I/F controller 209 switches a connection to PSTN controller 211 or to network controller 212 under a control of CPU 201. PSTN controller 211 controls lines via PSTN 107. Network controller 212 controls transmission and reception of calls via IP network 106.

CPU 201 controls transmission of an ENUM query that inquires ENUM server 103 of a NAPTR record that corresponds to a destination terminal, reception of a response (hereafter referred to as "ENUM response") to the ENUM query. CPU 201 further controls transmission of a query (hereafter referred to as "IP address query") that inquires DNS server 104 of an IP address, and reception of a response (hereafter referred to as "IP address response") to the IP address query.

Display 205 includes, for example, an LCD (Liquid Crystal Display). Display 205 displays the current status of IP phone 101, an input telephone number and other information. In addition, display 205 displays HTML texts downloaded from Web server 105.

Figure 3:
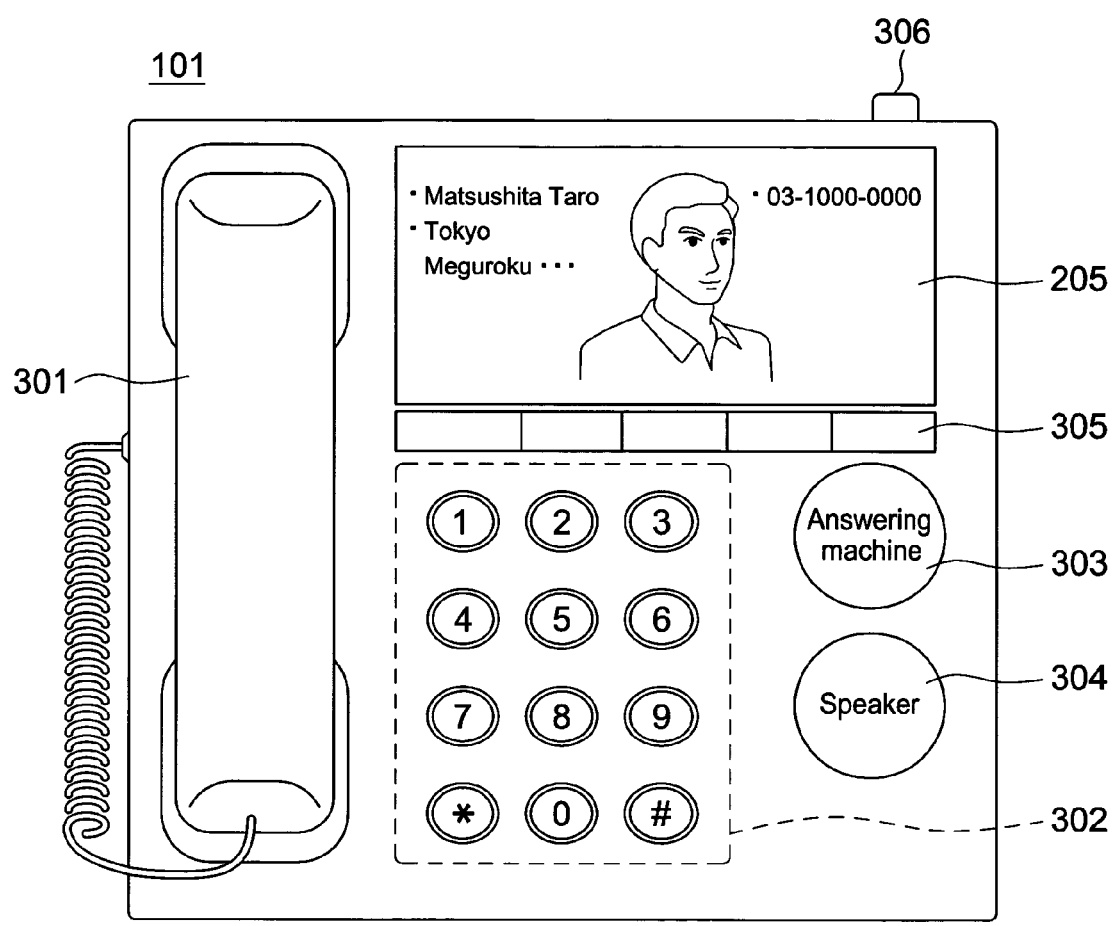
FIG. 3 illustrates a front view of an appearance of the IP telephone apparatus according to the embodiment.

FIG. 3 illustrates a front view of an appearance of IP phone 101 according to the embodiment. IP phone 102 has the same configuration as IP phone 101.

As shown in FIG. 3, IP phone 101 includes receiver 301 that receives an operator's voice. IP phone 101 further includes numeric keypad 302 that is used to input telephone numbers and other information. To the right side of numeric keypad 302, AM (Answering Machine) key 303 and speaker key 304 are located. AM key 303 is used to switch to the answering machine mode. Speaker key 304 is used to change to an external voice output. Furthermore, IP phone 101 includes function key 305 that can be used to set various functions such as a single touch transmission. IP phone 101 further includes, on its side, interface (LAN I/F) 306 for LAN that is connected to IP network 106.

Display 205 configured with an LCD or the like is located above function key 305. Display 205 displays, for example, caller information (e.g., caller numbers and names) downloaded from Web server 105.

Figure 4:
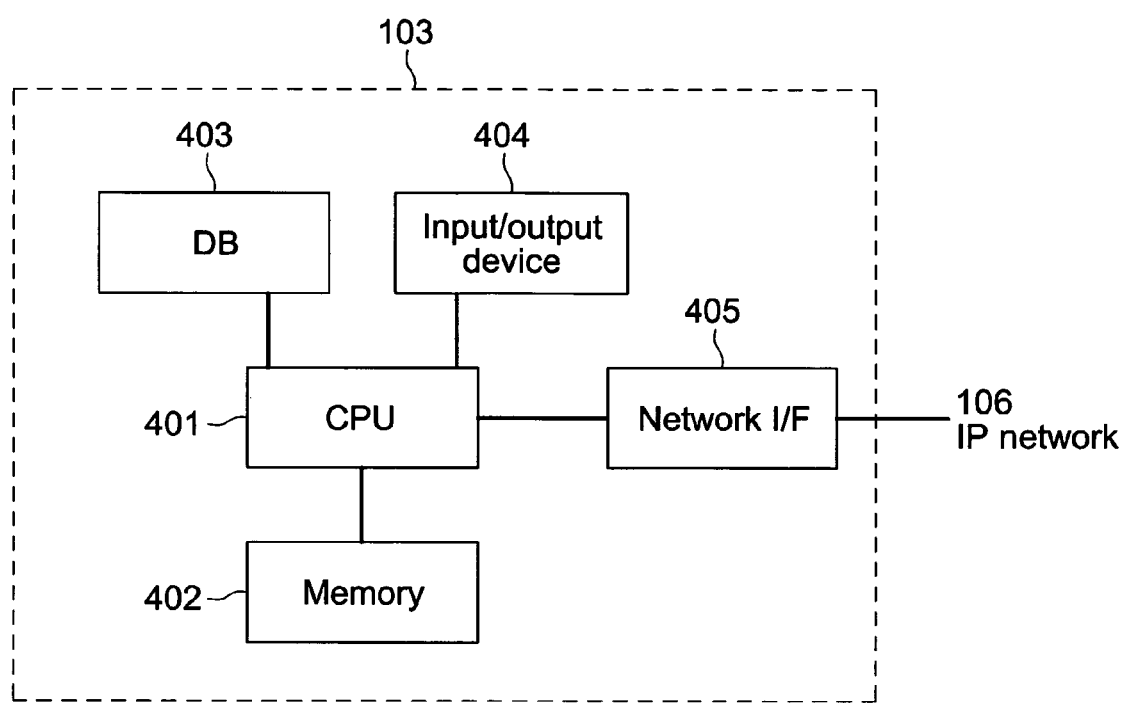
FIG. 4 is a block diagram illustrating a typical configuration of an ENUM server in the IP telephone system according to the embodiment.

FIG. 4 is a block diagram illustrating a typical configuration of ENUM server 103 in the IP telephone system according to the embodiment. DNS server 104 and Web server 105 have the same hardware configuration as ENUM server 103 except that they have different data stored in their databases.

As shown in FIG. 4, ENUM server 103 is configured with CPU 401 that controls the entire operation of ENUM server 103. Memory 402 is connected to CPU 401. Memory 402 has ROM and RAM functions. The ROM stores such programs as a control program for ENUM server 103, which is read in and executed by CPU 401. The RAM functions as a work memory when CPU 401 executes the control program.

Database (DB) 403 is connected to CPU 401. DB 403 stores a NAPTR record. Upon receiving an ENUM query from IP phone 101, for example, CPU 401 searches DB 403 for a NAPTR record corresponding to the ENUM query. CPU 401 then transmits a corresponding NAPTR record to IP phone 101 that has transmitted the ENUM query.

Furthermore, input/output device 404 is connected to CPU 401. Input/output device 404 includes an input device such as a keyboard and an output device such as a display. The input device is used, for example, to add and edit the data stored in DB 403. The output device is used for administrators of ENUM server 103 to verify the data stored in DB 403.

Furthermore, network interface (I/F) 405 is connected to CPU 401. Network I/F 405 is an interface for IP network 106 to which ENUM server 103 is connected.

FIG. 5 illustrates an example of a set of NAPTR records stored in DB 403 of ENUM server 103 according to the present embodiment. FIG. 5 shows the NAPTR records that are stored in connection with the domain names associated with telephone numbers "0310000000" and "0310000001".

In FIG. 5, two URIs "81310000000@tokyo.sip.jp" and "//www.tokyo.sip.com/user81310000000.html" are stored in connection with domain name "0.0.0.0.0.0.0.1.3.1.8.e164.arpa" associated with telephone number "0310000000". The service field of the first URI specifies "E2U+sip", which indicates that the terminal specified by "0310000000" is able to perform the SIP protocol. The service field of the second URI specifies "E2U+http", which indicates that the terminal specified by "0310000000" is able to perform the http protocol.

Furthermore, two URIs "81310000001@tokyo.mail.com" and "//www.tokyo.sip.com/user81310000001.html" are stored in connection with domain name "1.0.0.0.0.0.0.1.3.1.8.e164.arpa" associated with telephone number "0310000001". The service field of the first URI specifies "E2U+sip", which indicates that the terminal specified by "0310000001" is able to perform the SIP protocol. The service field of the second URI specifies "E2U+http", which indicates that the terminal specified by "0310000001" is able to perform the http protocol.

Figure 6:
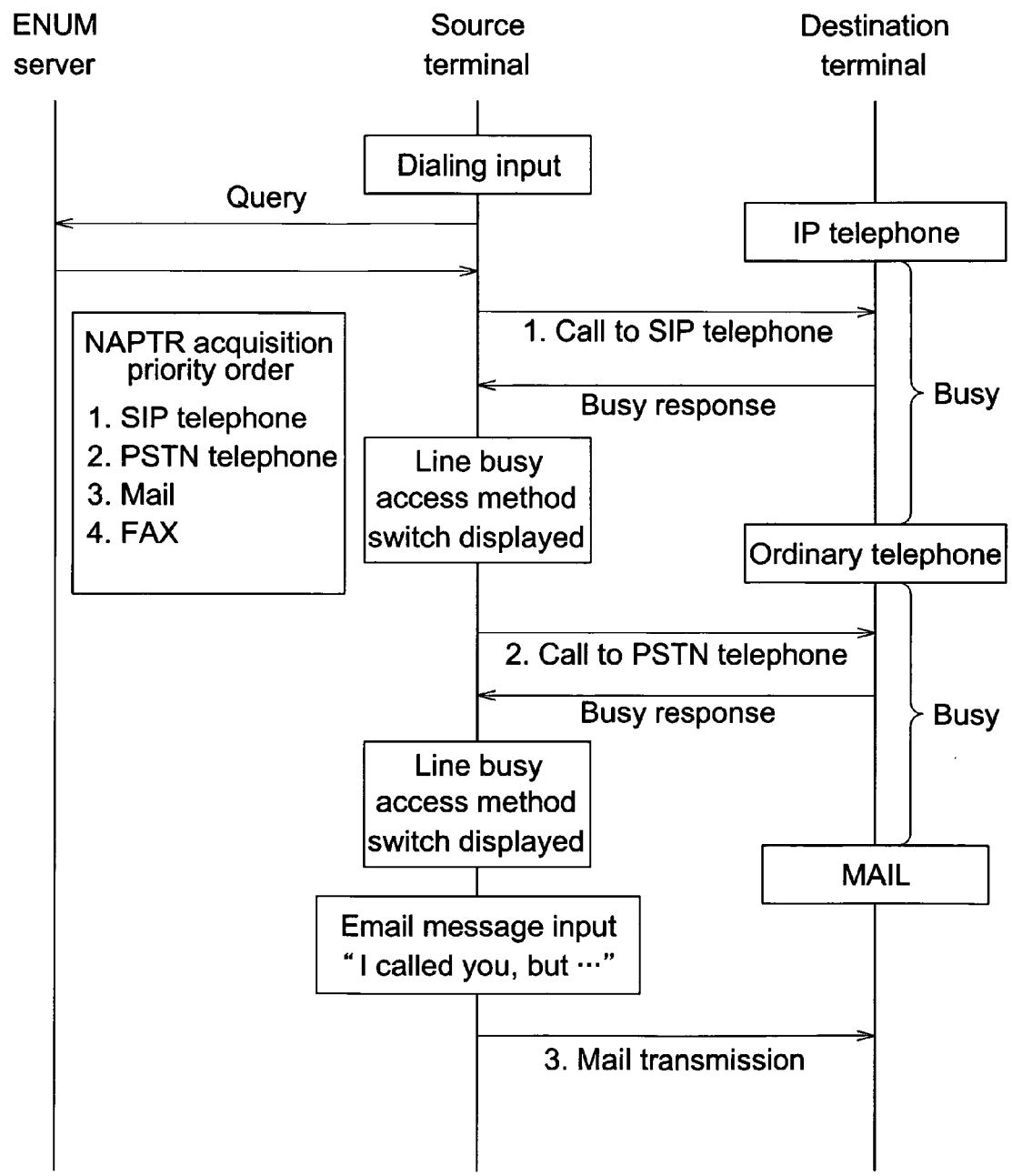
FIG. 6 is a sequence diagram illustrating a processing flow among a source IP telephone apparatus, the ENUM server and a destination IP telephone apparatus according to the embodiment.

The following describes, with reference to FIG. 6, an operational flow in the IP telephone system according to the present embodiment when IP phone 101 places a call to IP phone 102 and the line is busy.

In this illustration, a plurality of NAPTR records are stored in connection with a telephone number (telephone number obtained from domain name) of the call destination (IP phone 102).

FIG. 7 shows a specific example of a set of NAPTR records that are stored in connection with the telephone number (telephone number obtained from domain name) of IP phone 102. The IP phone 102 user stores four NAPTR records that correspond to it's own telephone number (0455445XXX). As access methods specified in the NAPTR records, "sip" (first priority), "ordinary telephone" (second priority), "e-mail" (third priority) and "Internet FAX" (forth priority) are stored. In the present embodiment, the access method is switched in the order in which the NAPTR records are stored. However, it is also possible to switch the access method in an ascending order of the order field values of the NAPTR records.

When IP phone 101 places a call to IP phone 102, the user inputs by dialing, to IP phone 101, the regular telephone number (0455445XXX) of IP phone 102. When the regular telephone number (0455445XXX) of IP phone 102 is input, IP phone 101 converts the call destination's telephone number into a domain name. More specifically, the following process is executed. IP phone 101 first coverts the input telephone number "0455445XXX" into the E.164 number "+81-4-55445XXX" including the country code. Then, "+81455445XXX" is obtained by maintaining + at the beginning and the numbers. Next, non numerical symbols are deleted, and dots are inserted between the numbers, resulting in "8.1.4.5.5.4.4.5.X.X.X". Then, the numbers are reversed, and data string ".e164.arpa" is added at the end. As a result, domain name "X.X.X.5.4.4.5.5.4.1.8.e164.arpa" is obtained.

After creating the domain name based on the dialed call destination's telephone number, IP phone 101 transmits, to ENUM server 103, an ENUM query for a NAPTR record based on the domain name.

ENUM server 103 receives the ENUM query transmitted from IP phone 101. ENUM server 103 then searches DB 403 for a NAPTR record that corresponds to domain name "X.X.X.5.4.4.5.5.4.1.8.e164.arpa", which is included in the ENUM query. As a result of the search, ENUM server 103 obtains the NAPTR records shown in FIG. 7. ENUM server 103 then sends, to IP phone 101, an ENUM response that includes the obtained NAPTR records.

IP phone 101 obtains, from ENUM server 103, the NAPTR records shown in FIG. 7 as the ENUM response in response to the ENUM query. As previously described, for the NAPTR records of the destination IP phone 102, there are four selectable methods: "sip", "ordinary telephone", "e-mail" and "Internet FAX".

IP phone 101 selects "sip" from the NAPTR records of the destination IP phone 102. "Sip" is stored as the first priority access method. IP phone 101 tries to establish a connection with IP phone 102 by the selected method. More specifically, IP phone 101 transmits, to DNS server 104, an IP address query for URI="info@sip.aaaa.com!", which is described in the first NAPTR record. IP phone 101 then obtains the IP address of IP phone 102. Next, IP phone 101 transmits, to IP phone 102, an INVITE request by specifying the IP address as the destination address. The INVITE request is sent in the form of an IP packet. When a SIP server is involved to control a call connection, there is no need to inquire DNS server 104 of an IP address.

When the destination IP phone 102 is busy, a busy response (busy) is sent to IP phone 101. When receiving the busy response (busy) from the destination IP phone 102, IP phone 101 displays, on display 205, a message notifying that the call destination is on the phone and that the access method is to be switched.

Next, IP phone 101 selects "ordinary telephone" from the NAPTR records of the destination IP phone 102. "Ordinary telephone" is stored as the second priority access method. The telephone number for accessing the destination IP phone 102 via PSTN is the telephone number that is first input. Therefore, IP phone 101 transmits a call to the call destination via PSTN 107 based on the telephone number (0455445XXX) that is first input.

When IP phone 101 transmits a call to the call destination based on the telephone number (0455445XXX) via PSTN 107, a call is received by a telephone that has telephone number "0455445XXX" via PSTN 107. For example, when the destination IP phone 102 has telephone number "0455445XXX", a call is received by IP phone 102 via PSTN 107. When a communication apparatus other than IP phone 102 has telephone number "0455445XXX", a call is received by that telephone apparatus.

In addition, for a plurality of NAPTR records that are stored, on ENUM server 103, in connection with one telephone number obtained from a domain name, it is possible to store as URIs, on ENUM server 103, not only telephone numbers of one communication terminal, but also destination numbers associated with a plurality of communication apparatuses (e.g., IP telephones, ordinary telephones, cellular phones, and PC) that can be used to contact the user.

When a communication apparatus (IP phone 102 or other communication apparatuses) that has telephone number "0455445XXX", which is transmitted from IP phone 101, is also busy, a busy response (busy) is sent to IP phone 101. When detecting a busy tone, IP phone 101 switches to the next possible access method. First, IP phone 101 displays, on display 205, a message notifying that the call destination is busy and that the access method is to be switched. Next, IP phone 101 selects "e-mail" from the NAPTR records of the destination IP phone 102. "E-mail" is stored as the third priority access method. The user then inputs an e-mail message in response to the message displayed on display 205. The e-mail message is input from input section 206. After performing an e-mail transmission operation, "miyajima.bbbb@jp.aaaa.com!" is set as a recipient address, after which an electronic mail containing the previously input message in the e-mail text is transmitted.

The IP phone 102 user acknowledges, by reading the e-mail received at its e-mail address "miyajima.bbbb@jp.aaaa.com!", that there was a call from the IP phone 101 user.

As described above, in order to access the call destination by using the URIs stored on ENUM server 103, a priority order is given in the order in which the NAPTR records (URIs) of the call destination are stored. When the calling user accesses the call destination by using one URI and the line is busy, the second priority URI is selected from the NAPTR records in order to access. Therefore, it is possible to switch the access method in an order that the call destination wishes without requiring the calling user to input a different number of the call destination in order to re-access.

In the description above, NAPTR records (URIs) are stored based on a priority order for switching the access method. However, it is further possible to use an order field value for this purpose.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-292866 filed on Oct. 5, 2004, entire content of which is expressly incorporated by reference herein.

What is claimed is:

1. An IP (Internet Protocol) telephone apparatus connected to an ENUM (Telephone Number Mapping) server, the ENUM server storing NAPTR (Naming Authority Pointer) records associated with telephone numbers, a NAPTR record including an access method and a destination information, the IP telephone apparatus comprising:
   a dialer configured to input a telephone number of a call destination;
   a display configured to display a message when a busy response is received from the call destination, wherein the message requests a user to confirm switching the access method;
   a data obtainer configured to obtain NAPTR records of the call destination from the ENUM server, based on the input telephone number of the call destination;
   a selector configured to select an NAPTR record from the obtained NAPTR records to transmit a call based on a priority order, and configured to select an NAPTR record with a next priority level when the user confirms switching the access method; and
   a transmitting unit configured to transmit a call to the call destination based on the access method and the destination information included in the NAPTR record selected by the selector.

2. The IP telephone apparatus according to claim 1, wherein the priority order for the NAPTR records is an order in which the NAPTR records are stored on the ENUM server.

3. The IP telephone apparatus according to claim 1, wherein the priority order for the NAPTR records is determined based on order field values of the NAPTR records.

4. An access switching method for switching an access method to access a call destination via an Internet network including a ENUM (Telephone Number Mapping) server, the ENUM server storing NAPTR (Naming Authority Pointer) records associated with telephone numbers, a NAPTR record including an access method and a destination information, the access switching method comprising:
   inputting a telephone number of the call destination;
   displaying a message when a busy response is received from the call destination, wherein the message requests a user to confirm switching the access method;
   obtaining NAPTR records of the call destination from the ENUM server, based on the input telephone number of the call destination;
   selecting an NAPTR record from the obtained NAPTR records for transmitting a call based on a priority order, and selecting an NAPTR record with a next priority level when the user confirms switching the access method; and
   transmitting a call to the call destination based on the access method and the destination information included in the selected NAPTR record.

5. A method of switching access to a call destination using an ENUM (Telephone Number Mapping) server that stores NAPTR (Naming Authority Pointer) records associated with a telephone number, comprising:
   inputting a telephone number of a call destination;
   displaying a message on a display of a source apparatus when a busy response is received from the call destination that informs the source apparatus that an access method is to be switched;
   obtaining NAPTR records of the call destination from the ENUM server;
   selecting an NAPTR record from the obtained NAPTR records to transmit a call based on a priority order;
   selecting an NAPTR record with a next priority level when a user confirms switching the access method; and
   transmitting a call to the call destination.

6. The method of claim 5, wherein displaying comprises displaying the message on a display of a source IP apparatus.

* * * * *